United States Patent [19]
Konstanzer et al.

[11] Patent Number: 5,654,625
[45] Date of Patent: Aug. 5, 1997

[54] SWITCHING CIRCUIT FOR A REACTIVE POWER COMPENSATION DEVICE HAVING SYNCHRONIZED ON AND OFF SWITCHING

[75] Inventors: Michael Konstanzer; Stefan Freitag, both of Freiburg, Germany

[73] Assignee: Fraunhofer Gesellschaft zur Forderung der angewandten Forschung e.V., Munich, Germany

[21] Appl. No.: 502,538

[22] Filed: Jul. 14, 1995

[30] Foreign Application Priority Data

Jul. 16, 1994 [DE] Germany .................. 44 25 247.1

[51] Int. Cl.$^6$ ................................................ G05F 1/70
[52] U.S. Cl. ................... 323/211; 323/240; 323/209
[58] Field of Search ............................ 323/208, 209, 323/210, 211

[56] References Cited

U.S. PATENT DOCUMENTS

| | | | |
|---|---|---|---|
| 4,348,631 | 9/1982 | Gyugyi et al. | 323/211 |
| 5,367,197 | 11/1994 | Klerkors | 323/211 |
| 5,374,853 | 12/1994 | Larsen et al. | 323/211 |
| 5,402,058 | 3/1995 | Larsen | 323/210 |
| 5,424,627 | 6/1995 | Clark et al. | 323/210 |
| 5,434,497 | 7/1995 | Larsen | 323/209 |

*Primary Examiner*—Jeffrey L. Sterrett
*Attorney, Agent, or Firm*—Antonelli, Terry, Stout & Kraus, LLP

[57] ABSTRACT

Using a switching circuit (2) for a reactive power compensation device (1), the compensation capacitors of the reactive power compensation device (1) can be switched on with voltage measuring devices (30, 31) which are switched between two phase conductors (3, 4) if the the voltage is the same on both sides of an open phase conductor switch (24). In a preferred embodiment, closing the second phase conductor switch (25) occurs triggered by a delay device (36) following a fixed delay time. In another preferred embodiment, switching on occurs when the voltage is the same between the phase conductors (4,5) on both sides of the second phase conductor switch (25), whereas this condition can be checked with two other voltage measuring devices switched between the phase conductors (4, 5) as well as with another equivalence comparator.

7 Claims, 3 Drawing Sheets

SWITCHING CIRCUIT FOR A REACTIVE POWER COMPENSATION DEVICE HAVING SYNCHRONIZED ON AND OFF SWITCHING

BACKGROUND OF THE INVENTION

1. Field of the Invention

The present invention relates to a switching circuit for a reactive power compensation device having in-line assembled capacitors as well as a circuit for closing and opening phase conductor switches with which the reactive power compensation device can be switched on and off during zero current passage to the phase conductors upon application of control signals.

2. Description of the Related Art

A switching circuit of this type is known by the name of RTPFC-(Real Time Power Factor Controller-) system from a brochure by the firm ELSPEC Engineering Ltd., in Tel-Mond, Israel, circulated in the spring of 1994. With this switching circuit, a reactive power compensation device can be switched using electronic switches during zero current passages of the compensation capacitors, which can be detected by a current measuring unit. Switching between various compensation groups of the reactive power compensation device occurs within a few seconds in order to avoid great switch-on surges. The number of compensation groups required depends on the frequency of switchings per time unit as well as on the discharging of the compensation capacitors of the individual compensation groups.

This switching circuit has the drawback that if big energy consumers, such as for example construction crane engines, are switched in rapid succession, a multiplicity of compensation groups having relatively short discharge constants are needed. Thus, in addition to disadvantageous high energy consumption due to the discharge of the switched off compensation capacitors, expensive in-line assembly of the switchable compensation groups on the reactive power compensation device is required.

SUMMARY OF THE INVENTION

The object of the present invention is to provide a switching circuit of the type described in the above introduction, with little energy consumption and without prior charge or discharge of the compensation capacitors, and rapid switching at temporally considerably varying intervals between one period and multiple periods of an alternating voltage in the phase conductors.

This object is solved according to the present invention by providing the switching circuit with at least two voltage measuring devices connected on both sides of the respective phase conductor switch between identical phase conductors, one of the phase conductors being uninterrupted, by being able to feed the output signals of the two voltage measuring devices connected between the identical phase conductors into the inputs of a comparator unit, by the output of the comparator unit being connected to an input of a control device, and by the control device being able to generate a switching signal when an external control signal for switching on the reactive power compensation device is applied to another input of the control device when the output signals of the voltage measuring devices connected to the comparator unit are the same following an output signal from the comparator unit, and being able to close the phase conductor switch disposed between the two voltage measuring devices connected to the comparator unit with this switching signal.

With the invented switching circuit, the reactive power compensation device can, therefore, be switched on and off to the phase conductors at any desired switching time, without requiring continuous charging or full discharging of the capacitors. In this way, minimizing energy losses and permitting utilization of the invented switching circuit both in the case of frequent switching and in the case switching cycles having relatively long periods of total switch off.

The charge state of the compensation capacitors can be checked by the voltage measuring device connected between a phase conductor switch and the compensation capacitors. Thus, successive switching after a period of alternating mains voltage or, in particular, within a few periods of alternating mains voltage can be conducted by using a reactive power compensation device composed of a single compensation group independent of the charge state of the compensation capacitors at the time of switching. Furthermore, checking the voltage at the compensation capacitors and between the phase conductors permits providing relatively high ohmic discharge resisters to be connected, solely for safety reasons, in parallel to the compensation capacitors. Thus, energy consumption is lowered due to the automatic discharge of the compensation capacitors.

Other useful embodiments and advantages of the present invention are the subject-matter of the subclaims and the following description of the drawings.

DESCRIPTION OF THE PREFERRED EMBODIMENTS

Figure 1:
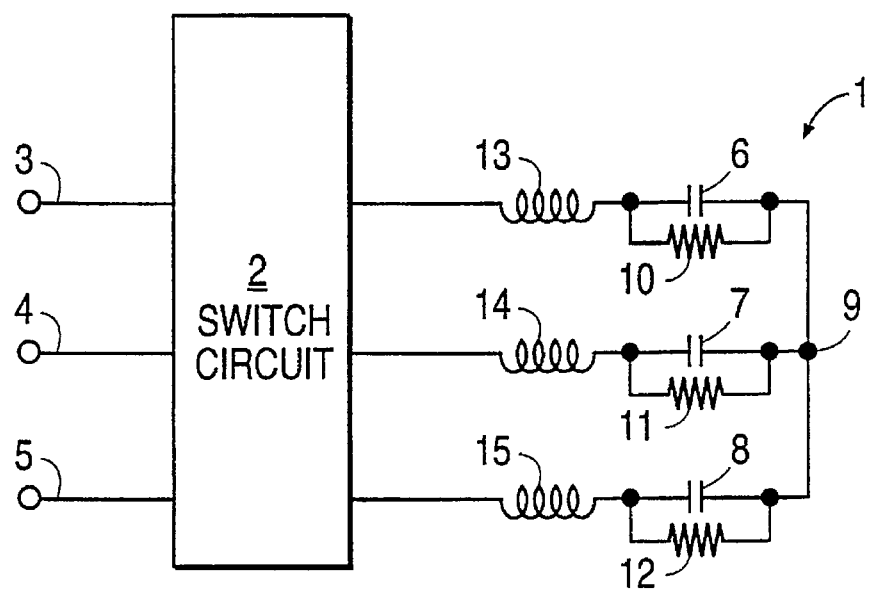
FIG. 1 shows a star compensation circuit which can be switched on and off to phase conductors using a switching circuit.

FIG. 1 shows in a wiring diagram, by way of example, a star compensation circuit 1, which can be switched on and off using a switching circuit 2 having a fixed interval when closing the phase conductor switches to a first phase conductor 3, a second phase conductor 4 and a third phase conductor 5. An alternating voltage is applied pairwise to the three phase conductors 3, 4, 5, which are phase shifted 120 degrees respectively. The star compensation circuit 1 forms a compensation group and is provided with a first compensation capacitor 6, a second compensation capacitor 7 and a third compensation capacitor 8, which are each connected respectively to a connection at a point of the star 9 and have the same capacities within the framework of manufacturing tolerances. Of course, if high reactive powers are to be compensated, multiple star compensation circuits 1 can be connected in tandem as a compensation group.

A first discharge resistor 10, a second discharge resistor 11 and a third discharge resistor 12 is connected to the respective compensation capacitor 6, 7, 8. The discharge resisters 10, 11, 12 are provided for safety and serve the purpose of automatically discharging the compensation capacitors 6, 7, 8. It is pointed out that the discharge resisters 10, 11, 12 are not absolutely necessary for operating switching circuit 2, but rather are provided in order to comply with safety regulations. Compensation capacitors 6, 7, 8 and discharge resisters 10, 11, 12 connected in parallel are connected to switching circuit 2 via a first choking coil 15, a second choking coil 14 and a third choking coil 15 respectively in order to smoothen the residual current peaks and filter upper harmonic waves.

Figure 2:
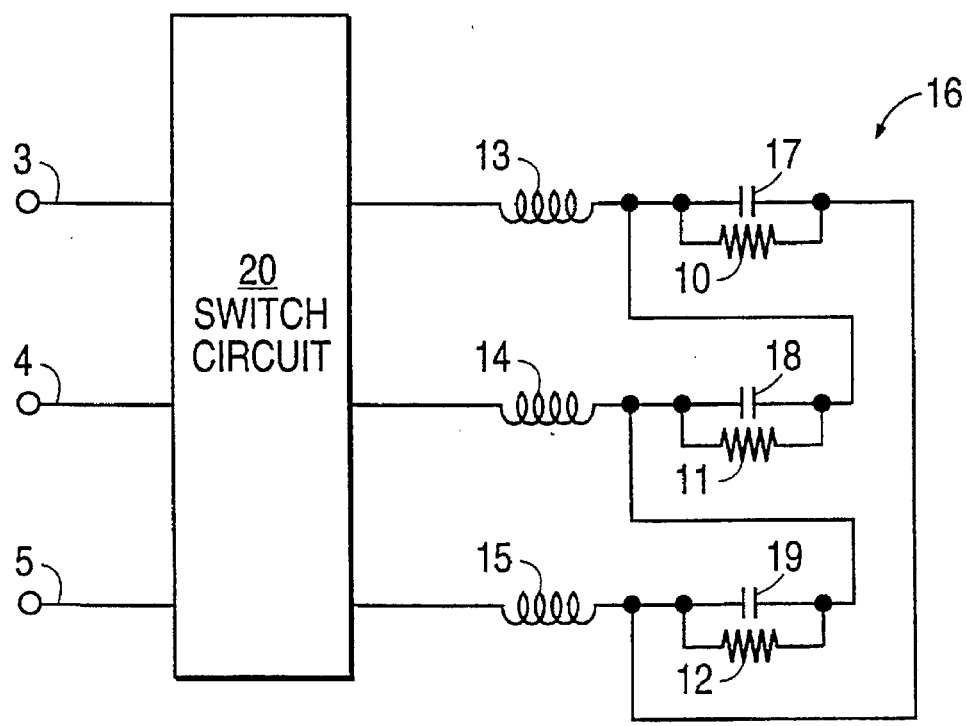
FIG. 2 shows a triangle compensation circuit which can be switched on and off to phase conductors using a switching circuit.

FIG. 2 shows in a wiring diagram, by way of example, a triangle compensation circuit 16, in which a compensation capacitor, 17, 18, or 19 is connected between two different phase conductors 3, 4, 5 respectively. The compensation capacitors 17, 18, 19 can be switched on and off using a switching circuit 20 having variable intervals between closing the phase conductor switches. In this preferred embodiment, the compensation capacitors 17, 18, 19 of the triangle compensation circuit 16, each bridged with a respective discharge resistor 10, 11, or 12 and connected in series to choking coils 13, 14, 15, have different size capacities. Multiple triangle compensation circuits 16 can be connected in tandem as a compensation group if high reactive powers need to be compensated.

Figure 3:
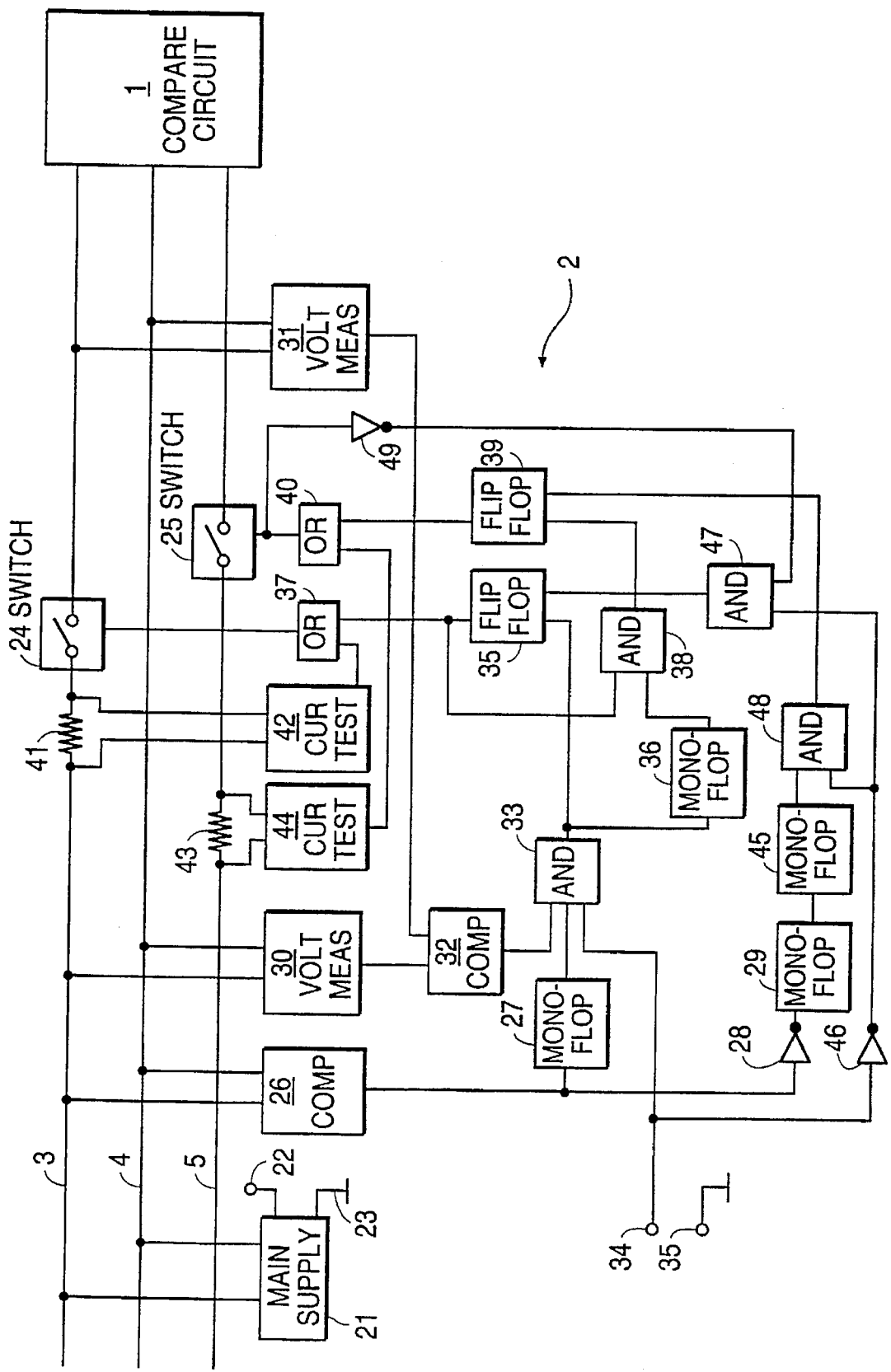
FIG. 3 shows a preferred embodiment of a switching circuit having a comparator unit for comparing the voltages between two phase conductors as well as having a fixed interval between the closing of two phase conductor switches.

FIG. 3 shows, in a block diagram, the switching circuit 2 having a fixed interval according to FIG. 1. This switching circuit 2 is set between the phase conductors 3, 4, 5 and the star compensation circuit. In order to supply voltage to the individual components and groups of components, switching circuit 2 is provided with a main supply unit 21, which is connected to the first phase conductor 3 and to the second phase conductor 4, at the supply voltage tap 22 of which a supply voltage can be tapped against a mass connection 23. For the purpose of clarity, the voltage supply lines to the components and groups of components are not shown in FIG. 3.

Switching circuit 2 is provided with a first phase conductor switch 24 and a second phase conductor switch 25, which are disposed in series in the first phase conductor 3 and in the third phase conductor 5 respectively. In this preferred embodiment, semiconductor switches, which can be bridged with a contactor, are provided as phase conductor switches 24, 25. By actuating the phase conductor switches 24, 25, the first compensation capacitor 6 and the third compensation capacitor 8 and, therefore, the second compensation capacitor 7 as well can be switched on and off to the phase conductors 3, 4.

The alternating voltage applied on the alternating current side between the first phase conductor 3 and the second phase conductor 4 is conveyed to the inputs of a synchronization comparator 26. If the voltage of the first phase conductor 3 is positive in relation to the second phase conductor 4, a low intensity signal is applied at the output of the synchronization comparator 28, whereas if the voltage of the first phase conductor 3 is negative in relation to the second phase conductor 4, a high intensity signal is applied at the output of the synchronization comparator 26. The output signal from the synchronization comparator 26 is fed to the input of a switch-on monoflop 27 and inverted by a synchronization inverter 28 to a synchronization-delay-monoflop 29. The switch-on monoflop 27 can be switched with an ascending incline, and the synchronization-delay-monoflop 29 can be switched with a descending incline of the output signal of the synchronization comparator 26.

Between the first phase conductor 3 and the second phase conductor 4, the inputs of a first voltage measuring device 30 are connected on the alternating voltage side of a first phase conductor switch 24, and the inputs of a second voltage measuring device 31 are connected on the compensation circuit side of the first phase conductor switch 24. The output signals of the voltage measuring devices 30, 31 are in proportion to the alternating voltage applied at the inputs. The output signal of the first voltage measuring device 30 and of the second voltage measuring device 31 are applied to the inputs of a first equivalence comparator 32. When the output signals of the voltage measuring devices 30, 31 are the the same, an output signal, which is short in comparison to the period of the alternating voltage between the phase conductors 3, 4, is applied at the output of the first equivalence comparator 32. The not inverted output signal of the switch-on-monoflop 27 and the output signal of the first equivalence comparator 32 are fed into two inputs of a first set-AND-gate 33 having altogether three inputs. The third input of the first set-AND-gate 33 can be fed with the intensity of a control signal which can be tapped between a remote signal input 34 against a mass connection 35.

The output signal of the first set-AND-gate 33 can be fed, on the one hand, to the set input of a first switch-flip-flop 35 and, on the other hand, to the input of a switch-delay-monoflop 36. The not inverted output signal of the first switch-flip-flop 35, on the one hand, can be fed to a first input of a first switch-OR-gate 37 having two inputs and, on the other hand, to a first input of a second set-AND-gate 38 having two inputs. The inverted output signal of the switch-delay-monoflop 36 is fed to the second input of the second set-AND-gate 38. This inverted output signal occurs after three quarters of the period of the alternating voltage between the first phase conductor 3 and the second phase conductor 4 as a high intensity signal. If high intensity signals are applied at the inputs of the second set-AND-gate 38 respectively, the set input of a second switch-flip-flop 39 can be triggered with a high intensity signal. The not inverted output signal of the second switch-flip-flop 39 is conveyed to a first input of a second switch-OR-gate 40 having two inputs.

In the first phase conductor 31, a first measurement resistor 41 is provided, which is connected before the first phase conductor switch 24 on the alternating voltage side. The voltage tapped at the first measurement resistor 41 is positive with a current flowing out of the star compensation circuit 1. If there is such a positive voltage drop at the first measurement resistor 41, a first current tester 42 can generate a high intensity output signal, which can be fed to the second input of the first switch-OR-gate 37. The first phase conductor switch 24 can be actuated with the output signal of the first switch-OR-gate 37. If the intensity level is high, the first phase conductor switch 24 can be closed, and if the intensity level is low, it can be opened.

In a corresponding manner, a second measurement resistor 43 is connected on the alternating voltage side of the second phase conductor switch 25 in the third phase conductor 5. The drop in voltage at the second measuring resistor 43 can be determined using a second current tester 44. When current flows from the star compensation circuit 1, the second current tester 44 supplies a high intensity level output signal, which can be fed to the second input of the second switch-OR-gate 40.

The inverted output signal from the synchronization-delay-monoflop 29 is conveyed to a switch monoflop 45 with a delay time of a quarter of the period of the alternating voltage applied between the first phase conductor 3 and the second phase conductor 4. In comparison to the period of the alternating voltage applied between the first phase conductor 3 and the second phase conductor 4, a brief output signal can be generated with the switch monoflop 45. The control signal applied at the remote signal input 34 is inverted and fed to a first input of a first reset-AND-gate 47 having two inputs and to a first input of a second reset-AND-gate 48 having two inputs.

The not inverted output signal of switch monoflop 45 can be conveyed to the second input of the second reset-AND-gate 48. The output signal of the first reset-AND-gate 47 is fed to the reset input of the first switch-flip-flop 35 and the output signal of the second reset-AND-gate 48 is fed to the reset input of the second switch-flip-flop 39. The output signal Of the second switch-OR-gate 40 inverted by a switching signal inverter 49 is transmitted to the second input of the first reset-AND-gate 47.

In the following, the manner of operation of switch circuit 2 for switching the star compensation circuit 1 on and off is described. After transition of the intensity level of the control signal applied at the remote signal input 34 from a low value to a high one for closing the phase conductor switch 24 provided in the first phase conductor 3, within a quarter of the period of the alternating voltage following the trigger signal delivered by the synchronization comparator 26, due to the high intensity level output signal of the switch-on monoflop 27 and if the voltage is the same between the first phase conductor 3 and the second phase conductor 4 on both sides of the open first phase conductor 24, a high intensity level output signal can be generated, which is applied via the first set-AND-gate 33 to the set input of the first switch-flip-flop 35 as well as to the input of the switch-delay-monoflop 36. The first switch-flip-flop 35 delivers a high intensity level switching signal, which runs via the first switch-OR-gate 37 in order to close the first phase conductor switch 24.

With a fixed delay time of three quarters of the period of the alternating voltage applied between the phase conductors 3, 4, the inverted output signal of the switch-delay-monoflop 36 jumps back to a high intensity level and switches the second set-AND-gate 38, to which the not inverted output signal of the first switch-flip-flop 35 is conveyed, through to the set input of the second switch-flip-flop 39. The second phase conductor switch 25 can be closed with the output signal of the second switch-flip-flop 39 via the second switch-OR-gate 40. The star compensation circuit 1 is thus switched to the phase conductors 3, 4, 5.

In order to switch of the star compensation circuit 1 from the phase conductors 3, 5, a low intensity level control signal, which sets the output signal of the first set-AND-gate 33 on a low intensity level, is applied at the remote signal input 34. The control signal transformed by the remote signal inverter 46 into a high intensity level signal is fed to the first reset-AND-gate 47 and into tho second reset-AND-gate 48. Due to the output signal of the second reset-AND-gate 48 following the delay time fixed by the synchronization monoflop 29 following the descending incline of the output signal of the synchronization comparator 26, a signal for resetting is applied to the reset input of the second switch-flip-flop 39. Therefore, a low intensity signal is applied at the output of the second switch-flip-flop 39. If the current from the star compensation circuit 1 drops to zero, the second phase conductor switch 25 can be opened during the zero current passage with the low intensity level output signal from the second switch-OR-gate 40.

Having opened the second phase conductor switch 25, due to the high intensity level output signal of the switching signal inverter 49 being applied at the first reset-AND-gate 47 the high intensity level signal can be applied to the reset input of the first switch-flip-flop 35. Thus, a low intensity level signal is applied at the output signal of the first switch-flip-flop 35. If the current from the star compensation circuit 1 drops to zero, the second phase conductor switch 24 can be opened during the zero current passage with the low intensity level output signal from the first switch-OR-gate 37.

With the switching circuit 2, rapidly succeeding switching on and off of the star compensation circuit 1 can also be conducted even, by way of illustration, still having half-charged compensation capacitors 6, 7, 8, because if the voltage is the same, switching is always between two phase conductors 3, 4, 5 and the respective compensation capacitor 5, 7, 8. When switching off, first the second phase conductor switch 25 opens and then the first phase conductor switch 24. Whereas when switching on, first the phase conductor switch 24 closes and then the second phase conductor switch 25.

Furthermore, with the switching circuit 2 shown in FIG. 3, if the compensation capacitors 6, 7, 8 are of the same size, a temporally constant switching on step, commencing in the descending incline of the alternating voltage between the phase conductors 3, 4 can be carried out with only one voltage measurement between the two phase conductors 3, 4. Closing the second phase conductor switch 25 occurs temporally constant with three quarters of the period of the alternating voltage between phase conductors 3, 4 following the closing of the first phase conductor switch 24 without current inrush with the same voltage between the alternating voltage at the phase conductors 4, 5 and the respective compensation capacitors 7, 8.

The switching behavior of the phase conductor switches 24, 25 in connection with the triggering by means of the switch-OR-gates 37, 40 can also be achieved by providing bidirectional thyristors (TRIAC'S). The output signals of the respective switch-flip-flops 35, 39 are conveyed to the control connections (GATES) of the TRIAC'S.

Figure 4:
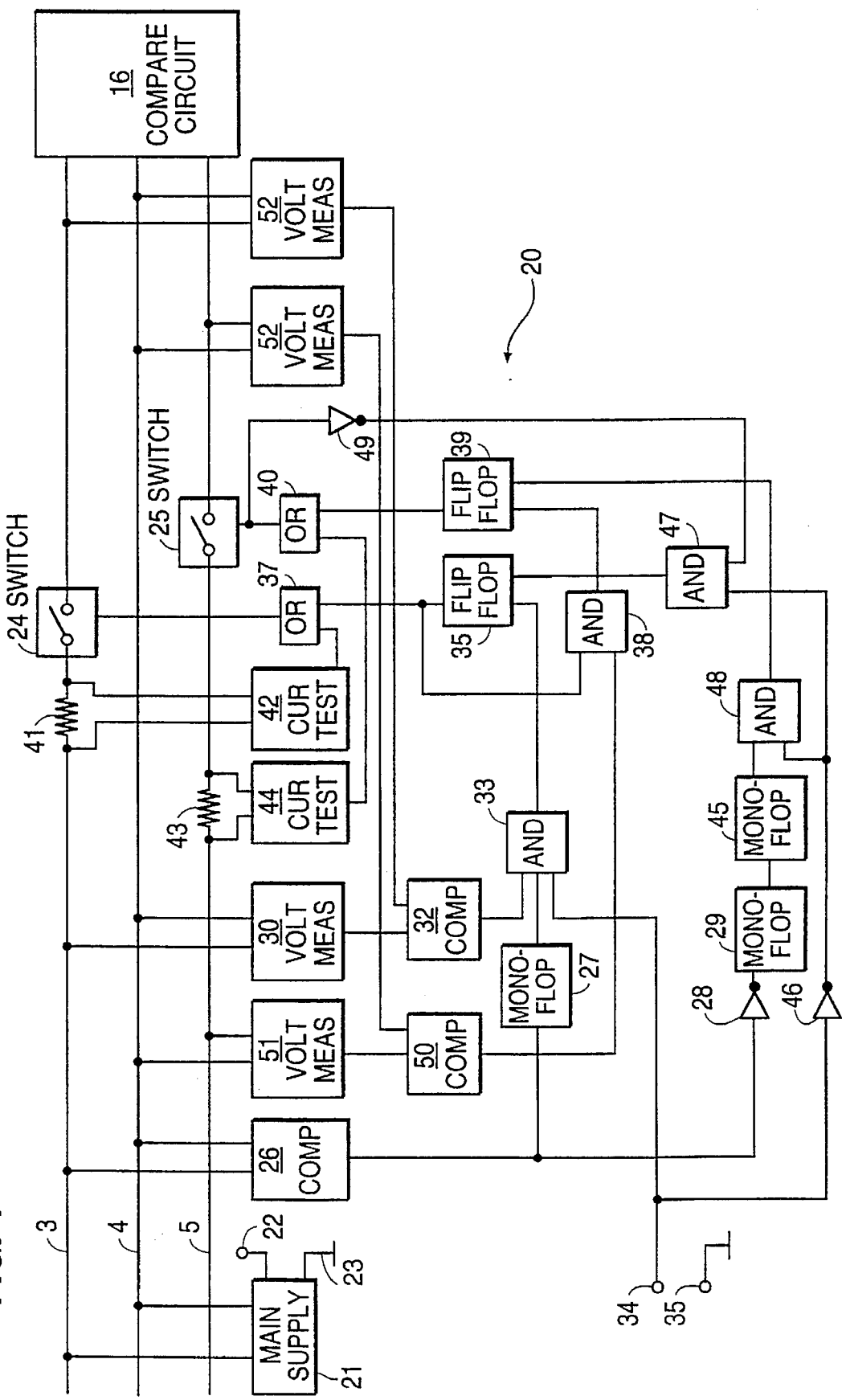
FIG. 4 shows a switching circuit having two comparator units for comparing the voltages between two pairs of different phase conductors as well as having variable intervals between the closing of two phase conductor switches.

FIG. 4 shows in a wiring diagram the switching circuit 20 having variable intervals between closing the phase conductor switches for switching on and off the triangle compensation circuit 16 having in-line assembled compensation capacitors 17, 18, 19 of varying sizes. The corresponding components in FIGS. 3 and 4 bear the same numbers and will not be explained again. The essential differences between the switching circuit 20 having variable intervals and the switching circuit 2 having a fixed interval is that the output signal of a second equivalence comparator 50 is applied to the second input of the second set-AND-gate 38 of the switching circuit 20 having variable intervals and that the inverted output signal of the switch-on-monoflop 27 is applied to the input of the first set-AND-gate 33. Thus, the switching-on step occurs between the negative apex and the zero passage of the alternating voltage between the phase conductors 3, 4.

The output signals of a third voltage measuring device 51 and a fourth voltage measuring device 52 can be applied to the inputs of the second equivalence comparator 50. The inputs of the third voltage measuring device 51 and of the fourth voltage measuring device 52 are each connected to the second phase conductor 4 and the third phase conductor 5 respectively on both sides of the phase conductor switch 25. The second equivalence comparator 50 delivers to an input of the second set-AND-gate 38 a short output signal, compared to the period of the alternating voltage applied at the second phase conductor 4 in relation to the third phase conductor 5. Depending of the charge state of the compensation capacitors 17, 18, 19, the delay time between closing the first phase conductor switch 24 and closing the second phase conductor switch 25 is between a quarter of and three quarters of the alternating voltage period.

The switching circuits 2, 20 make the compensation circuits 1, 16 independent of the discharge time of the compensation capacitors 6, 7, 8; 17, 18, 19 and, in particular, permit quick successive switching on and off the compensation circuits 1, 16. Thus, due to the temporally determined discharge behavior, even with different switch-off times, of the compensation capacitors 6, 7, 8, switchings can be carried out in quick succession with a fixed delay time respectively with a second voltage measurement between the phase conductors 4, 5 within a few periods of the alternating voltage. The switching functions of monoflops 27, 29, 36, 45, of the flip-flops 35, 39, of the comparators 26, 30, 31, 51, 51 and the logical gates 33, 37, 38, 40, 47, 48 in conjunction with the inverters 28, 46, 49 can, of course, also be carried out by an algorithm of a data processing program.

What is claimed is:

1. A switching circuit for a reactive power compensation device having in-line assembled capacitors for closing and opening at least one phase conductor switch with which, upon application of control signals, the reactive power compensation device can be switched on and off during zero current passages of at least two phase conductors, comprising:

a synchronizing unit connected to said phase conductors;

at least two voltage measuring devices, with each respective voltage measuring device being connected on opposite sides of a phase conductor switch, with one of said phase conductors being an uninterrupted phase conductor;

a comparator unit receiving output signals of said voltage measuring devices;

a control unit receiving an output of said synchronizing unit, an output of said comparator unit and an external control signal for switching on said reactive power compensation device, said control unit generating a switching signal, when the output signals of said voltage measuring devices connected to said comparator unit are the same following an output signal of said synchronizing unit;

wherein said phase conductor switch disposed between said two voltage measuring devices is closed responsive to said switching signal.

2. A switching circuit according to claim 1, wherein, in the event of three said phase conductors, said switching circuit more specifically comprises first and second phase conductor switches, with each phase conductor switch being connected in mutually different phase conductors, and wherein one input of each said voltage measuring devices is connected to said uninterrupted phase conductor.

3. A switching circuit according to claim 2, wherein said control unit comprises an AND-gate receiving the output signal of said comparator unit, the output signal of said synchronization unit, and said external control signal for switching said reactive power compensation device on and off.

4. A switching circuit according to claim 3, wherein said control unit closes said first phase conductor switch with the output signal of said AND-gate, and closes, via a first delay device providing a fixed delay time of substantially three quarters of a period of a phase-shifted alternating voltage of a phase of a same frequency fed to said phase conductors, said second phase conductor switch provided in said phase conductor not connected to said comparator.

5. A switching circuit according to claim 3, wherein said at least two voltage measuring devices of said switching circuit more specifically comprises at least first, second, third and fourth voltage measuring devices and said comparator is connected to said first and second voltage measuring device; and a second comparator unit, the inputs of which are each connected to the outputs of said third and fourth voltage measuring devices.

6. A switching circuit according to claim 5, wherein said second comparator unit generates, after actuation of said first phase conductor switch is triggered by said first comparator unit, a switching signal to close said second phase conductor switch when the voltage is the same on both sides of said second phase conductor switch.

7. A switching circuit according to claim 4, wherein said control unit, in order to switch off said reactive power compensation device, being able to open in an apex of a voltage in said phase conductor said second phase conductor switch, triggered by a second delay device, before said first phase conductor switch following an output signal, delayed by a quarter of the period of the alternating voltage, from said synchronization unit.

* * * * *